(12) United States Patent
Matias et al.

(10) Patent No.: US 9,743,060 B1
(45) Date of Patent: Aug. 22, 2017

(54) SYSTEM AND METHOD FOR PRESENTING AND VIEWING A SPHERICAL VIDEO SEGMENT

(71) Applicant: GOPRO, INC., San Mateo, CA (US)

(72) Inventors: Joven Matias, Cardiff, CA (US); David Newman, San Diego, CA (US); Ha Phan, Solana Beach, CA (US); Timothy Bucklin, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/050,275

(22) Filed: Feb. 22, 2016

(51) Int. Cl.
*G11B 27/34* (2006.01)
*H04N 9/87* (2006.01)
*H04N 5/232* (2006.01)
*H04N 5/77* (2006.01)

(52) U.S. Cl.
CPC .............. *H04N 9/87* (2013.01); *G11B 27/34* (2013.01); *H04N 5/23238* (2013.01); *H04N 5/23293* (2013.01); *H04N 5/772* (2013.01)

(58) Field of Classification Search
None
See application file for complete search history.

(56) References Cited

U.S. PATENT DOCUMENTS

| | | |
|---|---|---|
| 6,434,265 B1 | 8/2002 | Xiong |
| 6,486,908 B1 | 11/2002 | Chen |
| 6,710,740 B2 | 3/2004 | Needham |
| 6,711,293 B1 | 3/2004 | Lowe |
| 6,788,333 B1 | 9/2004 | Uyttendaele |
| 7,403,224 B2 | 7/2008 | Fuller |
| 7,983,502 B2 | 7/2011 | Cohen |
| 8,411,166 B2 | 4/2013 | Miyata |

(Continued)

FOREIGN PATENT DOCUMENTS

| | | |
|---|---|---|
| EP | 0605045 A1 | 7/1994 |
| EP | 0650299 A1 | 4/1995 |

(Continued)

OTHER PUBLICATIONS

U.S. Appl. No. 14/920,427, filed Oct. 22, 2015, entitled "Apparatus and Methods for Embedding Metadata Into Video Stream".

(Continued)

*Primary Examiner* — Eileen Adams
(74) *Attorney, Agent, or Firm* — Sheppard Mullin Richter & Hampton LLP

(57) ABSTRACT

Systems and methods for presenting and viewing a spherical video segment is provided. The spherical video segment including tag information associated with an event of interest may be obtained. The tag information may identify a point in time and a viewing angle at which the event of interest is viewable in the spherical video segment. An orientation of a two dimensional display may be determined based upon output signals of a sensor. A display field of view within the spherical video segment may be determined and presented on the display based upon the orientation of the display. The display field of view may be captured as a two dimensional video segment. If the viewing angle of the event of interest is outside the display field of view proximate the point in time, a notification may be presented within the display field of view.

21 Claims, 6 Drawing Sheets

(56) References Cited

U.S. PATENT DOCUMENTS

| | | | |
|---|---|---|---|
| 8,606,073 B2 | 12/2013 | Woodman | |
| 8,670,030 B2 | 3/2014 | Tanaka | |
| 8,842,197 B2 | 9/2014 | Singh | |
| 8,890,954 B2 | 11/2014 | O'Donnell | |
| 8,896,694 B2 | 11/2014 | O'Donnell | |
| 9,019,396 B2 | 4/2015 | Kiyoshige | |
| 9,158,304 B2 | 10/2015 | Fleck | |
| 9,342,534 B2 | 5/2016 | Singh | |
| 9,409,646 B2 | 8/2016 | Fleck | |
| 9,473,758 B1 | 10/2016 | Long | |
| 9,602,795 B1 | 3/2017 | Matias | |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1 | 5/2003 | Arpa | |
| 2003/0160862 A1 | 8/2003 | Charlier | |
| 2004/0010804 A1 | 1/2004 | Hendricks | |
| 2004/0021780 A1 | 2/2004 | Kogan | |
| 2004/0047606 A1 | 3/2004 | Mikawa | |
| 2004/0075738 A1 | 4/2004 | Burke | |
| 2004/0135900 A1 | 7/2004 | Pyle | |
| 2004/0169724 A1 | 9/2004 | Ekpar | |
| 2005/0033760 A1 | 2/2005 | Fuller | |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2007/0030358 A1 | 2/2007 | Aoyama | |
| 2007/0120986 A1 | 5/2007 | Nunomaki | |
| 2007/0140662 A1 | 6/2007 | Nunomaki | |
| 2008/0094499 A1 | 4/2008 | Ueno | |
| 2008/0118100 A1 | 5/2008 | Hayashi | |
| 2009/0251558 A1 | 10/2009 | Park | |
| 2009/0262206 A1 | 10/2009 | Park | |
| 2010/0045773 A1 | 2/2010 | Ritchey | |
| 2010/0097443 A1 | 4/2010 | Lablans | |
| 2010/0238304 A1 | 9/2010 | Miyata | |
| 2010/0250022 A1 | 9/2010 | Hines | |
| 2010/0289924 A1 | 11/2010 | Koshikawa | |
| 2010/0299630 A1 | 11/2010 | McCutchen | |
| 2011/0013778 A1 | 1/2011 | Takumai | |
| 2011/0115883 A1* | 5/2011 | Kellerman | G06F 3/012 348/46 |
| 2011/0141300 A1 | 6/2011 | Stec | |
| 2011/0261227 A1 | 10/2011 | Higaki | |
| 2012/0206565 A1 | 8/2012 | Villmer | |
| 2012/0242798 A1 | 9/2012 | Mcardle | |
| 2013/0058532 A1 | 3/2013 | White | |
| 2013/0058619 A1 | 3/2013 | Miyakawa | |
| 2013/0127903 A1 | 5/2013 | Paris | |
| 2013/0176403 A1 | 7/2013 | Varga | |
| 2013/0177168 A1 | 7/2013 | Inha | |
| 2013/0182177 A1 | 7/2013 | Furlan | |
| 2013/0210563 A1* | 8/2013 | Hollinger | H04N 5/2252 473/570 |
| 2013/0235226 A1 | 9/2013 | Karn | |
| 2014/0037268 A1 | 2/2014 | Shoji | |
| 2014/0039884 A1 | 2/2014 | Chen | |
| 2014/0240122 A1 | 8/2014 | Roberts | |
| 2015/0055937 A1 | 2/2015 | Van Hoff | |
| 2015/0058102 A1 | 2/2015 | Christensen | |
| 2015/0142211 A1 | 5/2015 | Shehata | |
| 2015/0166476 A1 | 6/2015 | Chen | |
| 2015/0186073 A1 | 7/2015 | Pacurariu | |
| 2015/0189221 A1 | 7/2015 | Nakase | |
| 2015/0287435 A1 | 10/2015 | Land | |
| 2015/0304532 A1 | 10/2015 | Bart | |
| 2015/0336015 A1 | 11/2015 | Blum | |
| 2015/0350614 A1 | 12/2015 | Meier | |
| 2015/0363648 A1 | 12/2015 | Li | |
| 2015/0367958 A1 | 12/2015 | Lapstun | |
| 2015/0370250 A1 | 12/2015 | Bachrach | |
| 2016/0005435 A1 | 1/2016 | Campbell | |
| 2016/0018822 A1 | 1/2016 | Nevdahs | |
| 2016/0031559 A1 | 2/2016 | Zang | |
| 2016/0054737 A1 | 2/2016 | Soll | |
| 2016/0076892 A1 | 3/2016 | Zhou | |
| 2016/0101856 A1 | 4/2016 | Kohstall | |
| 2016/0112713 A1 | 4/2016 | Russell | |
| 2016/0129999 A1 | 5/2016 | Mays | |
| 2016/0139596 A1 | 5/2016 | Na | |
| 2016/0139602 A1 | 5/2016 | Kohstall | |
| 2016/0179096 A1 | 6/2016 | Bradlow | |
| 2016/0189101 A1 | 6/2016 | Kantor | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0295108 A1 | 10/2016 | Cao | |
| 2016/0304198 A1 | 10/2016 | Jourdan | |
| 2016/0306351 A1 | 10/2016 | Fisher | |
| 2016/0313734 A1 | 10/2016 | Enke | |
| 2016/0327950 A1 | 11/2016 | Bachrach | |
| 2016/0336020 A1 | 11/2016 | Bradlow | |
| 2016/0366290 A1 | 12/2016 | Hoshino | |

FOREIGN PATENT DOCUMENTS

| | | |
|---|---|---|
| EP | 0661672 A1 | 7/1995 |
| WO | 2009047572 A1 | 4/2009 |
| WO | 2014090277 A1 | 6/2014 |

OTHER PUBLICATIONS

U.S. Appl. No. 14/949,786, filed Nov. 23, 2015, entitled "Apparatus and Methods for Image Alignment".

U.S. Appl. No. 14/927,343, filed Oct. 29, 2015, entitled "Apparatus and Methods for Rolling Shutter Compensation for Multi-Camera Systems".

U.S. Appl. No. 15/001,038, filed Jan. 19, 2016, entitled "Metadata Capture Apparatus and Methods".

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

Farin et al., "Shortest Circular Paths on Planar Graphs," In 27th Symposium on Information Theory in the Benelux 2006, 8 pgs.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

Foote J et al: "FlyCam: Practical Panoramic Video and Automatic Camera Control", Multimedia and Expo, 2000. ICME 2000. 2000 IEEE International Conference on New York, NY, USA Jul. 30-Aug. 2, 2000, Piscataway, NJ, USA, IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

PCT International Search Report for PCT/EP2014/057352 dated Jun. 27, 2014.

(56) References Cited

OTHER PUBLICATIONS

PCT International Search Report for PCT/EP2014/058008 dated May 26, 2014.
PCT International Search Report for PCT/EP2014/061897 dated Sep. 15, 2014.
Perazzi et al., "Panoramic Video from Unstructured Camera Arrays," Eurographics, vol. 34 (2015), No. 2, 12pgs.
Ryan Jackson: "Shooting 360-degree video with four GoPro HD Hero cameras/Ryan Jackson Photography" Feb. 8, 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014].
Zhi et al., "Toward Dynamic Image Mosaic Generation With Robustness to Parallax," IEEE Transactions on Image Processing, vol. 21, No. 1, Jan. 2012, pp. 366-378.
"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.
O'Donovan, A., et al., "Real Time Capture of Audio Images and their Use with Video," 2007 IEEE Workshop on Applications of Signal Processing to Audio and Acoustics, Oct. 21-24, 2007, pp. 10-13.
O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.
PCT International Search Report and Written Opinion for PCT/US15/38913, dated Sep. 29, 2015, 15 Pages.

\* cited by examiner

SYSTEM AND METHOD FOR PRESENTING AND VIEWING A SPHERICAL VIDEO SEGMENT

FIELD OF THE INVENTION

The systems and methods described herein generally relate to presenting and viewing a spherical video segment.

BACKGROUND OF THE INVENTION

Captured video segments may include content captured in multiple views with multiple perspectives. If users are able to choose their view point within the captured video segments during playback, they may miss content available in other views and/or areas of the captured video segments. Missing content may cause the user to have a less than satisfactory experience.

SUMMARY

The disclosure herein relates to presenting and viewing a spherical video segment. A spherical video segment may include digital content presented in a three dimensional view including a 360-degree horizontal field of view and/or a 180-degree vertical field of view. The system and/or method described herein may be configured to obtain the spherical video segment from a repository of video segments. The system and/or method may determine an orientation of a two dimensional display based upon output signals generated via a sensor. The output signals may convey information related to the orientation of the display. A display field of view within the spherical video segment may be determined. The display field of view may be presented on the display based on the orientation of the display. For example, the display field of view may follow a portion of the 360-degree horizontal field of view (e.g., 90-degrees of the 360-degrees, such that the other 270-degrees of the horizontal field of view may not be within the display field of view) and a portion of the 180-degree vertical field of view (e.g., 45-degrees of the 180-degrees, such that the other 135-degrees of the vertical field of view may not be within the display field of view) based upon how the display is moved and/or oriented (e.g., if the display is angled up by a certain number of degrees, the display field of view may be determined to be angled up by the same number of degrees). The display field of view of the spherical video segment may be presented on the display for a user to view different angles and/or perspectives at any given point in time of the spherical video segment by moving the display in different directions and/or angles. The three dimensional view may include depth information associated with the spherical video segment. Zoom controls may be provided which may allow for the increase and/or decrease of visible degrees during playback within the display field of view of the spherical video segment.

In some embodiments, the display field of view may be captured and/or recorded as a two dimensional video segment. User controls may be provided via the display and/or an application associated with presentation of the spherical video segment on the display that may allow the user viewing and/or consuming the spherical video segment to record the presented display field of view. For example, the user may choose to make a recording of the content of the two dimensional display of the display field of view as the user moves the display in different directions and/or orients the display at different angles. This may be referred to as a virtual camera, as the user may make as many recordings of the two dimensional display as the user wishes. The user controls may allow the user to start, pause, stop, and/or allow for other controls to control capture of the display field of view as the two dimensional video segment (e.g., record in slow motion, etc.). In this manner, the user may capture highlights and/or events of interest within the spherical video segment in a single two dimensional video segment. The two dimensional video segment may be stored as a separate video segment than the spherical video segment. The two dimensional video segment may be shared with other users and/or consumers to view, such that the user and/or other consumers of the spherical video segment and/or the two dimensional video segment may not have to search for the highlights and/or events of interest on their own within the spherical video segment.

In some embodiments, one or more events of interest may be tagged and/or presented within the spherical video segment. Events of interest may include one or more of a highlight or a climax of the spherical video segment, something occurring within the spherical video segment apart from a focal (e.g., action) point of the spherical video segment, and/or other event of interest within the spherical video segment. The system and/or method may obtain tag information associated with the event of interest within the spherical video segment. The information may identify a point in time in the spherical video segment and a viewing angle within the spherical video segment at which the event of interest is viewable in the spherical video segment. While presenting the spherical video segment via the display, the system and/or method may determine, proximate to the point in time, whether the viewing angle of the event of interest is located within the display field of view. If the event of interest is outside the display field of view (e.g., with reference to the example above, if the event of interest is located within the 270-degrees of the horizontal field of view not within the display field of view and/or the 135-degrees of the vertical field of view not within the display field of view), alert information may be generated indicating that the event of interest for the spherical video segment may be located outside the field of view. A notification may be generated and presented within the display field of view to alert the user which direction to move and/or orient the display at which time during the spherical video segment in order to view the event of interest. The notification may be graphical (e.g., arrows, etc.), audible (e.g., spoken directions), and/or in any other form. Users may tag and/or mark the spherical video segment with their own events of interest to be stored and shared for future reference of the spherical video segment, either by the users themselves or for other consumers to view.

A system configured to present and view a spherical video segment may include one or more client computing platform(s). The server(s) and the client computing platform(s) may communicate in a client/server configuration, and/or via another configuration. The client computing platform(s) may include one or more processors configured by machine-readable instructions to execute computer program components. The computer program components may include a spherical segment component, an authentication component, an orientation component, a field of view component, a presentation component, a capture component, a notification component, and/or other components.

The spherical segment component may be configured to obtain the spherical video segment. The spherical video segment may be included within a repository of video segments. A repository of images and/or video segments may be available via the system. The repository of images and/or video segments may be stored within an electronic storage, one or more server(s), external resources, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images.

In some embodiments, the spherical video segment may include tag information associated with an event of interest within the spherical video segment. The tag information may identify a point in time within the spherical video segment and a viewing angle within the spherical video segment at which the event of interest is viewable in the spherical video segment. The event of interest may include any occurrence within the spherical video segment such as a notable moment and/or interesting point in time within the spherical video segment duration. The event of interest may be a moment that a user wishes to share with other viewers and/or consumers of the spherical video segment (e.g., the user and/or other users may be interested in the moment and/or event of interest). For example, the event of interest may include one or more of a highlight or a climax of the spherical video segment, something occurring within the spherical video segment apart from a focal (e.g., action) point of the spherical video segment, and/or other event of interest within the spherical video segment.

The authentication component may be configured to authenticate a user associated with client computing platform(s) accessing the repository of images and/or video segments via the system. The authentication component may manage accounts associated with users and/or consumers of the system. The user accounts may include user information associated with users and/or consumers of the user accounts. User information may include information stored by client computing platform(s), server(s), and/or other storage locations.

The orientation component may be configured to determine the orientation of a display based on output signals of a sensor of client computing platform(s). For example, if one of client computing platform(s) is a mobile device (e.g., a smartphone), the orientation component may be configured to determine the orientation of the display based on the output signals of the client computing device when the user moves the smartphone in one or more directions (e.g., up, down, left, right, etc.). The orientation of the display may be indicated by a number of degrees in one or more directions. For example, the orientation may be defined in one or more of a Cartesian coordinate system, a cylindrical and/or polar coordinate system, a spherical and/or polar coordinate system.

The field of view component may be configured to determine a display field of view within the spherical video segment to be presented on the display based on the orientation of the display. The field of view component may be configured to determine the field of view within the spherical video segment to be presented on the display based on the orientation of the display including determining a viewing angle in the spherical video segment that corresponds to the orientation of the display. The field of view component may be configured to determine the field of view within the spherical video segment to be presented on the display based on the orientation of the display including identifying the display field of view within the spherical video segment that is present at the viewing angle. The display field of view may include a horizontal field of view (e.g., left and/or right), a vertical field of view (e.g., up and/or down), and/or other field of views.

The field of view component may be configured to, proximate to the point in time, determine whether the viewing angle of the event of interest is located within the display field of view. Proximate to the point in time at which the event of interest is viewable may include one or more of a predefined time period prior to the point in time at which the event of interest is viewable, a predefined time period after the point in time at which the event if viewable, and/or the point in time at which the event of interest is viewable. As discussed above, the display field of view may be determined on a recurring or ongoing basis. The display field of view may indicate a current field of view determined based upon the orientation of the display associated with client computing platform(s) during presentation of the spherical video segment. The display field of view may change one or more times over the course of presentation of the spherical video segment via the display. The display field of view may include the viewing angle visible to the user via the display at a current point in time, as numerous fields of view that are not visible to the user may be available at the current point in time (e.g., 180-degrees to the left or right of the display field of view may not be visible to the user via the display field of view unless the display is moved to the left or right). The field of view component may automatically alter the display field of view for the user automatically to display the event of interest and/or the user may alter the display field of view based upon the movements of the client computing platform(s).

The capture component may be configured to capture the display field of view as a two dimensional video segment. Capturing the display field of view as the two dimensional video segment may include recording the display field of view as the two dimensional video segment such that as the user is using the display associated with client computing platform(s) as a viewfinder for visual content included within the spherical video segment, the capture component may record and/or capture the user's actions and/or movements (e.g., the display field of view) throughout the spherical video segment via client computing platform(s). For example, as the user is viewing the spherical video segment via the display associated with client computing platform(s), the capture component may record the display field of view (e.g., the visual content being displayed on the display associated with client computing platform(s)), including any movements of the display field of view including when the user may move the display associated with client computing platform(s) to the left, right, up, and/or down, resulting in movement of the display field of view within the spherical video segment.

The notification component may be configured to, responsive to a determination proximate to the point in time that the viewing angle is outside the display field of view, generate alert information indicating the event of interest for the spherical video segment is located outside the display field of view. The alert information may indicate the location of the event of interest within the spherical video segment indicated by the tag information. The alert information may include the viewing angle associated with the tag information, the point in time associated with the tag information, and/or other information related to the event of interest indicated by and/or associated with the tag information.

The notification component may be configured to effectuate presentation of a notification based upon the alert information. The notification may include one or more of a graphical notification, an audible notification, a sensory notification, and/or other types of notifications. For example, the notification may include an alert message presented within the display field of view of the spherical video segment. The notification, for example, may include an alert sound audible to the user. An example sensory notification may include a vibration and/or light notification. The notification may indicate to the user that the user may be missing, has missed, and/or may be about to miss the event of interest of the spherical video segment that may be occurring outside the display field of view.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
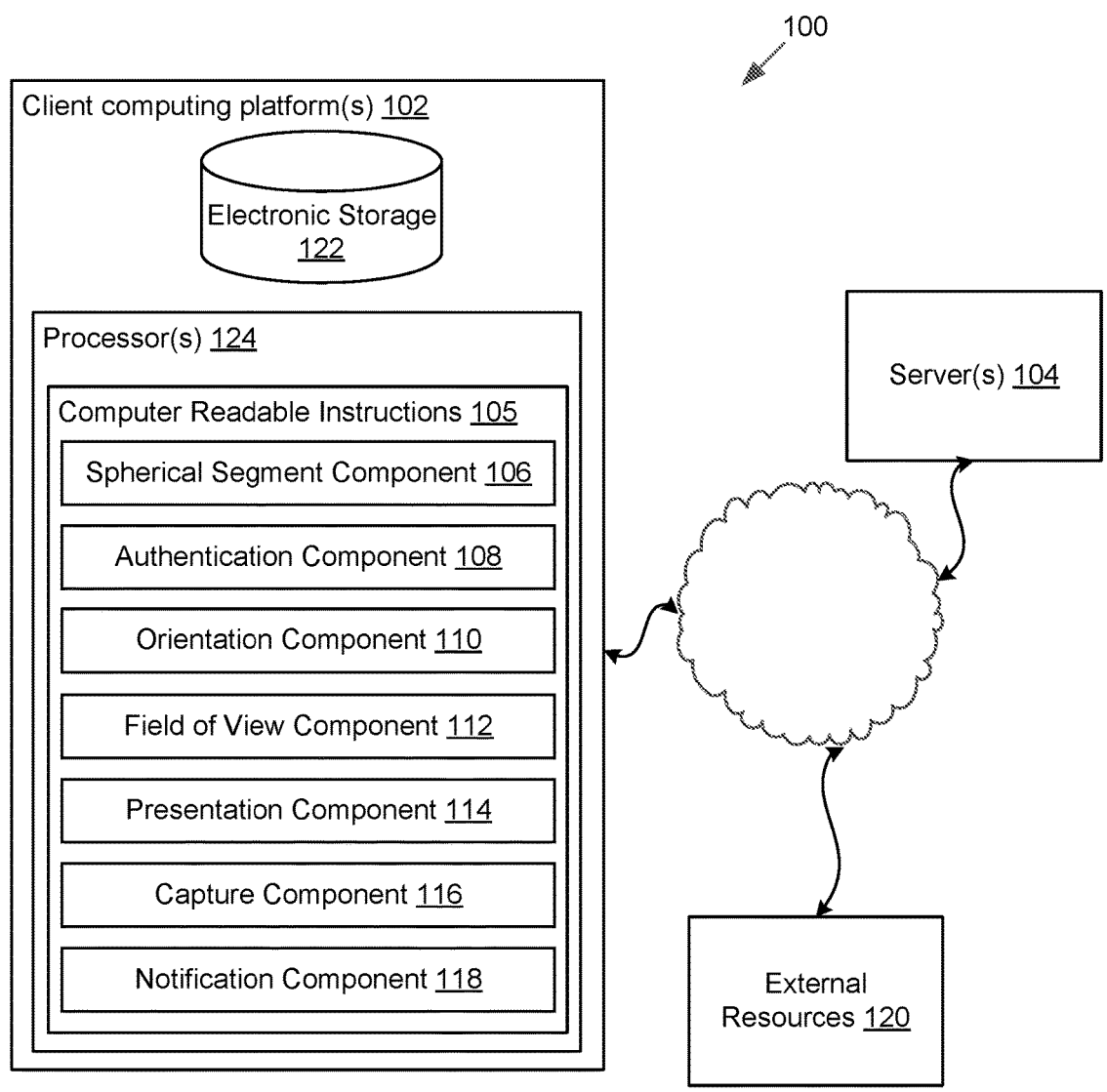
FIG. 1 illustrates a system configured for presenting and viewing a spherical video segment, in accordance with one or more implementations.

FIG. 1 illustrates an example system 100 that is configured for presenting and viewing a spherical video segment. A spherical video segment may include digital content presented in a three dimensional view including a 360-degree horizontal field of view and/or a 180-degree vertical field of view. The system and/or method described herein may be configured to obtain the spherical video segment from a repository of video segments. The system and/or method may determine an orientation of a two dimensional display based upon output signals generated via a sensor. The output signals may convey information related to the orientation of the display. A display field of view within the spherical video segment may be determined. The display field of view may be presented on the display based on the orientation of the display. For example, the display field of view may follow a portion of the 360-degree horizontal field of view (e.g., 90-degrees of the 360-degrees, such that the other 270-degrees of the horizontal field of view may not be within the display field of view) and a portion of the 180-degree vertical field of view (e.g., 45-degrees of the 180-degrees, such that the other 135-degrees of the vertical field of view may not be within the display field of view) based upon how the display is moved and/or oriented (e.g., if the display is angled up by a certain number of degrees, the display field of view may be determined to be angled up by the same number of degrees). The display field of view of the spherical video segment may be presented on the display for a user to view different angles and/or perspectives at any given point in time of the spherical video segment by moving the display in different directions and/or angles. The three dimensional view may include depth information associated with the spherical video segment. Zoom controls may be provided which may allow for the increase and/or decrease of visible degrees during playback within the display field of view of the spherical video segment In some embodiments, the display field of view may be captured and/or recorded as a two dimensional video segment. User controls may be provided via the display and/or an application associated with presentation of the spherical video segment on the display that may allow the user viewing and/or consuming the spherical video segment to record the presented display field of view. For example, the user may choose to make a recording of the content of the two dimensional display of the display field of view as the user moves the display in different directions and/or orients the display at different angles. This may be referred to as a virtual camera, as the user may make as many recordings of the two dimensional display as the user wishes. The user controls may allow the user to start, pause, stop, and/or allow for other controls to control capture of the display field of view as the two dimensional video segment (e.g., record in slow motion, etc.). In this manner, the user may capture highlights and/or events of interest within the spherical video segment in a single two dimensional video segment. The two dimensional video segment may be stored as a separate video segment than the spherical video segment. The two dimensional video segment may be shared with other users and/or consumers to view, such that the user and/or other consumers of the spherical video segment and/or the two dimensional video segment may not have to search for the highlights and/or events of interest on their own within the spherical video segment.

In some embodiments, one or more events of interest may be tagged and/or presented within the spherical video segment. Events of interest may include one or more of a highlight or a climax of the spherical video segment, something occurring within the spherical video segment apart from a focal (e.g., action) point of the spherical video segment, and/or other event of interest within the spherical video segment. The system and/or method may obtain tag information associated with the event of interest within the spherical video segment. The information may identify a point in time in the spherical video segment and a viewing angle within the spherical video segment at which the event of interest is viewable in the spherical video segment. While presenting the spherical video segment via the display, the system and/or method may determine, proximate to the point in time, whether the viewing angle of the event of interest is located within the display field of view. If the event of interest is outside the display field of view (e.g., with reference to the example above, if the event of interest is located within the 270-degrees of the horizontal field of view not within the display field of view and/or the 135- degrees of the vertical field of view not within the display field of view), alert information may be generated indicating that the event of interest for the spherical video segment may be located outside the field of view. A notification may be generated and presented within the display field of view to alert the user which direction to move and/or orient the display at which time during the spherical video segment in order to view the event of interest. The notification may be graphical (e.g., arrows, etc.), audible (e.g., spoken directions), and/or in any other form. Users may tag and/or mark the spherical video segment with their own events of interest to be stored and shared for future reference of the spherical video segment, either by the users themselves or for other consumers to view.

As illustrated in FIG. 1, system 100 may include one or more client computing platform(s) 102, one or more server(s) 104, electronic storage 122, one or more physical processor(s) 124 configured to execute machine-readable instructions 105, one or more computer program components, and/or other components.

One or more physical processor(s) 124 may be configured to execute machine-readable instructions. Executing machine-readable instructions 105 may cause the one or more physical processor(s) 124 to effectuate presentation of the spherical video segment. Machine-readable instructions 105 may include one or more computer program components such as spherical segment component 106, authentication component 108, orientation component 110, field of view component 112, presentation component 114, capture component 116, notification component 118, and/or other components.

In some implementations, client computing platform(s) 102 may be configured to provide remote hosting of the features and/or function of machine-readable instructions 105 to one or more server(s) 104 that may be remotely located from client computing platform(s) 102. However, in some implementations, one or more features and/or functions of client computing platform(s) 102 may be attributed as local features and/or functions of one or more server(s) 104. For example, individual ones of server(s) 104 may include machine-readable instructions (not shown in FIG. 1) comprising the same or similar components as machine-readable instructions 105 of client computing platform(s) 102. Server(s) 104 may be configured to locally execute the one or more components that may be the same or similar to the machine-readable instructions 105. One or more features and/or functions of machine-readable instructions 105 of client computing platform(s) 102 may be provided, at least in part, as an application program that may be executed at a given server 104.

Client computing platform(s) 102 may include one or more of a cellular telephone, a smartphone, a digital camera, a laptop, a tablet computer, a desktop computer, a television set-top box, smart TV, a gaming console, and/or other computing platforms.

Client computing platform(s) 102, server(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which client computing platform(s) 102, server(s) 104, and/or external resources 120 may be operatively linked via some other communication media.

Spherical segment component 106 may be configured to obtain the spherical video segment. The spherical video segment may be included within a repository of video segments. A repository of images and/or video segments may be available via system 100. The repository of images and/or video segments may be stored within electronic storage 122, one or more server(s) 104, external resources 120, a cloud, and/or any other storage location. Individual images and/or video segments of the repository of images and/or video segments may be stored in different locations. The repository of images and/or video segments may be associated with different users. The video segments may include a compilation of videos, video segments, video clips, and/or still images. While the present disclosure may be directed to previously captured spherical video and/or spherical video segments captured by one or more image capturing devices, one or more other implementations of system 100, client computing platform(s) 102, and/or server(s) 104 may be configured for other types of media items. Other types of media items may include one or more of audio files (e.g., music, podcasts, audio books, and/or other audio files), multimedia presentations, photos, slideshows, and/or other media files. The spherical video segment may be received from one or more storage locations associated with client computing platform(s) 102, server(s) 104, and/or other storage locations where spherical video segments may be stored.

Authentication component 108 may be configured to authenticate a user associated with client computing platform(s) 102 accessing the repository of images and/or video segments via system 100. Authentication component 108 may manage accounts associated with users and/or consumers of system 100. The user accounts may include user information associated with users and/or consumers of the user accounts. User information may include information stored by client computing platform(s) 102, server(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 104), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 108 may be configured to obtain user information via one or more client computing platform(s) 102 (e.g., user input via a user interface, etc.). If a user and/or consumer does not have a preexisting user account associated with system 100, a user and/or consumer may register to receive services provided by system 100 via a website, web-based application, mobile application, and/or user application. Authentication component 108 may be configured to create a user ID and/or other identifying information for a user and/or consumer when the user and/or consumer registers. The user ID and/or other identifying information may be associated with one or more client computing platform(s) 102 used by the user and/or consumer. Authentication component 108 may be configured to store such association with the user account of the user and/or consumer. A user and/or consumer may associate one or more accounts associated with social network services, messaging services, and the like with an account provided by system 100.

If the spherical video segment is stored in a storage location external to client computing platform(s) 102 and/or is spherical segment component is located within one or more server(s) 104, spherical segment component 106 may effectuate transmission of the spherical video segment to client computing platform(s) 102 associated with the user and/or consumer. The spherical video segment may be transmitted to client computing platform(s) 102 on which users may consume the spherical video segment. Spherical segment component 106 may be configured to host the spherical video segment over a network. For example, the spherical video segment may be hosted over the internet such that users may access the spherical video segment via the internet. Hosting the spherical video segment over the internet may include uploading and/or storing the spherical video segment on one or more server(s) 104 wherein the servers process requests and/or deliver the spherical video segment to client computing platform(s) 102. This may include serving separate digital files for the spherical video segment, streaming the spherical video segment, and/or other delivery mechanisms. Spherical segment component 106 may be configured to host the spherical video segment over a network by communicating information (e.g., via streaming digital content data, and/or other visual information) from server(s) 104 to client computing platform(s) 102 for presentation on one or more displays associated with client computing platform(s) 102. The digital content transmitted to a given client computing platform 102 may correspond to the spherical video segment being presented for consumption by user at the given client computing platform 102.

Users may consume the spherical video segment by viewing the spherical video segment via client computing platform(s) 102 and/or an associated display device. Client computing platform(s) 102 may include one or more display devices configured to display the spherical video segment. Client computing platform(s) 102 may include a two dimensional display configured to present two dimensional images. For example, the spherical video segment may be presented via the two dimensional display in a two dimensional format, rather than a three dimensional format such that the user associated with client computing platform(s) 102 may view the spherical video segment in the two dimensional format. Client computing platform(s) 102 may include a sensor configured to generate output signals conveying information related to an orientation of the display. The orientation of the display may refer to a relative position of the display. The orientation of the display may be indicated by a number of degrees in one or more directions. For example, the orientation may be defined in one or more of a Cartesian coordinate system, a cylindrical and/or polar coordinate system, a spherical and/or polar coordinate system.

A spherical video segment may include a captured three dimensional video segment that may be viewed, tagged, edited, and/or distributed. For example, the spherical video segment may include a playback of a live captured video (e.g., captured via one or more cameras). The spherical video segment may include multiple views such that at least a portion of the spherical video segment is outside a display field of view of a user viewing the spherical video segment at a given point in time via the display associated with client computing platform(s) 102. For example, the spherical video segment may include one or more of a 360-degree horizontal field of view, a 180-degree vertical field of view, and/or other views. The display associated with client computing platform(s) 102 may display only a portion of the spherical video segment (e.g., the display may only display a portion of the 360-degree horizontal field of view and/or a portion of the 180-degree vertical field of view). As such, other portions of the spherical video segment that are not displayed via the display associated with client computing platform(s) 102 at a given point in time may still be available to view.

Orientation component 108 may be configured to determine the orientation of the display based on the output signals of the sensor of client computing platform(s) 102. For example, if one of client computing platform(s) 102 is a mobile device (e.g., a smartphone), orientation component 108 may be configured to determine the orientation of the display based on the output signals of client computing device 102 when the user moves the smartphone in one or more directions (e.g., up, down, left, right, etc.). As discussed above, the orientation of the display may be indicated by a number of degrees in one or more directions. For example, the orientation may be defined in one or more of a Cartesian coordinate system, a cylindrical and/or polar coordinate system, a spherical and/or polar coordinate system.

Field of view component 112 may be configured to determine a display field of view within the spherical video segment to be presented on the display based on the orientation of the display. Field of view component 112 may be configured to determine the field of view within the spherical video segment to be presented on the display based on the orientation of the display including determining a viewing angle in the spherical video segment that corresponds to the orientation of the display. Field of view component 112 may be configured to determine the field of view within the spherical video segment to be presented on the display based on the orientation of the display including identifying the display field of view within the spherical video segment that is present at the viewing angle. The display field of view may include a horizontal field of view (e.g., left and/or right), a vertical field of view (e.g., up and/or down), and/or other field of views.

Field of view component 112 may be configured to determine the display field of view within the spherical video segment based on how the user is holding and/or moving the display associated with client computing platform(s) 102. For example, the user may move, turn, and/or orient the display of client computing platform(s) 102 to change his or her field of view based on an angle and/or direction of the orientation of the display associated with client computing platform(s) 102. The orientation of the display may reflect the viewing angle in the spherical video segment. For example, if the user holds the display associated with client computing platform(s) 102 straight ahead such that the display associated with client computing platform(s) 102 is oriented at a 90-degree vertical angle relative to a surface level (e.g., the ground at 0-degrees and/or the X-axis), the display field of view within the spherical video segment to be presented on the display may be a 90-degree vertical display field of view. The viewing angle in the spherical video segment that corresponds to the orientation of the display may then be the 90-degree vertical viewing angle. If the user orients the display associated with client computing platform(s) 102 at a 75-degree vertical angle relative to the surface level (e.g., the ground at 0-degrees and/or the X-axis) while moving the display associated with client computing platform(s) 102 100-degrees to the right from an initial point (e.g., the initial point may be 0-degrees horizontally), the display field of view within the spherical video segment to be presented on the display may be a 75-degree vertical angle display field of view (e.g., the display field of view may be tilted down towards the surface level) and 100-degrees to the right from the initial point. The viewing angle in the spherical video segment that corresponds to the orientation of the display may then be the 75-degree vertical viewing angle, turned 100-degrees to the right.

Presentation component 114 may be configured to effectuate presentation of the display field of view of the spherical video segment on the display. The user associated with client computing platform(s) 102 may view the spherical video segment on the display of client computing platform(s) 102. The determination of the orientation of the display and the determination of the display field of view within the spherical video segment for presentation on the display may occur recursively during playback of the spherical video segment. In this manner, whichever direction client computing platform(s) 102 moves and/or is oriented, presentation component 114 may be configured to effectuate presentation of the display field of view of the spherical video segment on the display in real-time. For example, if at 30 seconds into the spherical video segment, the user associated with client computing platform(s) 102 moves the display associated with client computing platform(s) 102 to the right by 30-degrees (e.g., 30-degrees horizontally) relative to a starting position and/or starting orientation of the display associated with client computing platform(s) 102, the spherical video segment may be displayed on the display associated with client computing platform(s) 102 to present the spherical video segment at 30-degrees to the right (e.g., horizontally) relative to an initial viewing angle in the spherical video segment. This may occur recursively such that the user may move the display associated with client computing platform(s) 102 in any direction to view different angles and/or perspectives of the spherical video segment at any given point in time.

Recursive determinations of the orientation of the display and the display field of view within the spherical video segment for presentation on the display may facilitate use of the display by the user as a viewfinder for visual content included within the spherical video segment. The viewfinder for the spherical video segment may represent the ability for the user to move the display associated with client computing platform(s) 102 on which the spherical video segment is displayed in order to view different angles and/or perspectives at any given point in time during the spherical video segment. For example, at each point in time during the spherical video segment, the 360-degree horizontal field of view and the 180-degree vertical field of view may be available for the user to view via the display associated with client computing platform(s) 102 by moving, rotating, and/or otherwise orienting the display associated with client computing platform(s) 102 in various directions and/or angles to view different moments and/or events within the spherical video segment. While the user is viewing the spherical video segment at a current position (e.g., an initial position), an event may be taking place 180-degrees to the right or left (e.g., horizontally) of the current position at that moment in time (e.g., 25 seconds into the spherical video segment). The user may move the display associated with client computing platform(s) 102 to explore other areas of the spherical video segment at the 25-second mark of the spherical video segment. The user may pause the spherical video segment at a particular point in time (e.g., 2 seconds into the spherical video segment) via one or more user controls, as will be discussed in further detail below, in order to move the display associated with client computing platform(s) 102 in various directions to explore the visual content captured within the spherical video segment in part and/or its entirety at the particular point in time (e.g., 2 seconds into the spherical video segment). Visual content and/or events included within the spherical video segment may include capture of particular objects (e.g., people, animals, landmarks, etc.), actions (e.g., a sporting event, riding a bicycle, etc.), landscapes (e.g., scenery, etc.), and/or other visual content and/or events that may be captured. In this manner, the user may facilitate use of the display as the viewfinder for visual content and/or events included within the spherical video segment.

Figure 2:
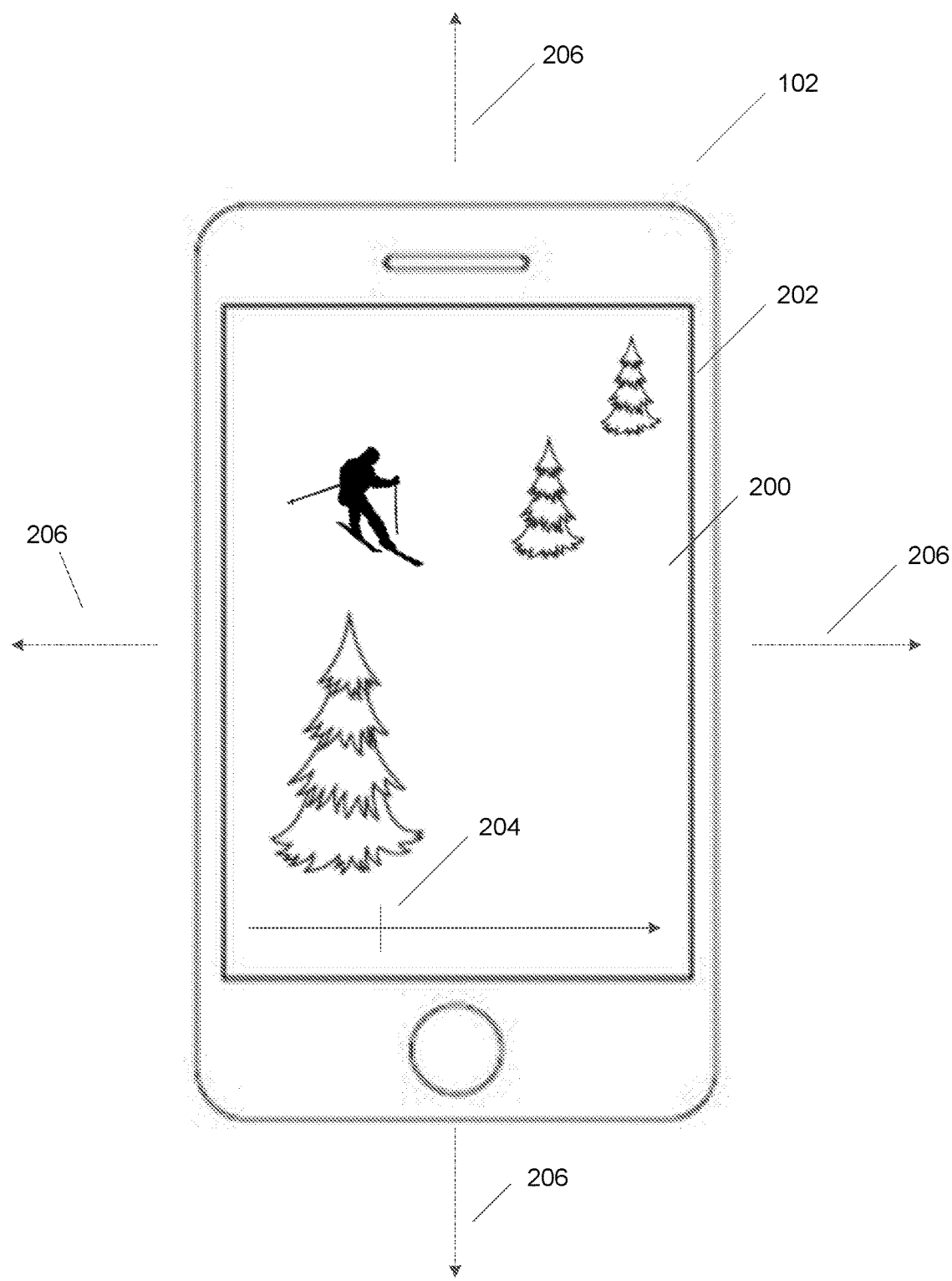
FIG. 2 illustrates an example spherical video segment being presented via a display, in accordance with one or more implementations.

By way of illustration, FIG. 2 depicts an example spherical video segment 200 being presented on display 202 of client computing platform 102, in accordance with one or more implementations. While client computing platform 102 is shown as a smartphone in FIG. 2, this is not meant to be a limitation of this disclosure, as client computing platform 102 may include any client computing platform 102 discussed above. FIG. 2 may represent an illustration of spherical video segment 200 being presented via display 202 associated with client computing platform 102 at an individual point in time 204 within spherical video segment 200 (e.g., 30 seconds into spherical video segment 200). Spherical video segment 200 may include a three dimensional spherical video segment presented via two dimensional display 202 (e.g., the user may be able to view and/or consume a portion of the three dimensional spherical video segment). While a portion of spherical video segment 200 is displayed via display 202 as the display field of view, other portions of the 360-degree horizontal field of view and/or 180-degree vertical field of view of spherical video segment 200 are not displayed via display 202. In order to view the other portions of spherical video segment 200, display 202 may be oriented in various angles and/or moved in various directions, as depicted by arrows 206, in order to change the display field of view presented via display 202. For example, while a skier may be depicted within spherical video segment 200 at the individual point in time 204, if display 202 is moved to the right or left by 180-degrees, the user may be able to view what is occurring 180-degrees from the skier within spherical video segment 200. While arrows 206 are depicted in four directions, this is for exemplary purposes only and is not meant to be limitation of this disclosure, as display 202 may be oriented in any angle and/or moved in any direction.

Returning to FIG. 1, capture component 116 may be configured to capture the display field of view as a two dimensional video segment. Capturing the display field of view as the two dimensional video segment may include recording the display field of view as the two dimensional video segment such that as the user is using the display associated with client computing platform(s) 102 as the viewfinder for visual content included within the spherical video segment, capture component 116 may record and/or capture the user's actions and/or movements (e.g., the display field of view, as discussed above) throughout the spherical video segment via client computing platform(s) 102. For example, as the user is viewing the spherical video segment via the display associated with client computing platform(s) 102, capture component 116 may record the display field of view (e.g., the visual content being displayed on the display associated with client computing platform(s) 102), including any movements of the display field of view including when the user may move the display associated with client computing platform(s) 102 to the left, right, up, and/or down, resulting in movement of the display field of view within the spherical video segment.

Capture component 116 may be configured to capture a single field of view over a span of time. For example, even if the display associated with client computing platform(s) 102 is moved and/or oriented in different directions, capture component 116 may record and/or capture only a single field of view. If the initial vertical field of view is a 90-degree vertical field of view and the initial horizontal field of view is 0-degrees, then capture component 116 may be configured to capture that field of view for the entire length of the spherical video segment and/or a particular length of time. User controls, as will be discussed in further detail below, may be used to configure recording and/or editing of the two dimensional video segment and/or post-capture of the two dimensional video segment.

As discussed above, the spherical video segment may be a three dimensional video segment, while the display associated with client computing platform(s) 102 may be a two dimensional display. As such, capture component 116 may be configured to capture and/or record the display field of view and create a separate video segment as the two dimensional video segment other than the spherical video segment.

Capture component 116 may be configured to store the two dimensional video segment. The two dimensional video segment may be stored via electronic storage 122, a cloud, and/or other storage device associated with system 100 and/or server(s) 104. The two dimensional video segment may be included within the repository of video segments discussed above. In this manner, the two dimensional video segment may be available for playback to view by other users and/or consumers. System 100 may effectuate presentation of the two dimensional video segment on the display associated with client computing platform(s) 102 for playback. System 100 may effectuate transmission of the two dimensional video segment to one or more client computing platform(s) 102 associated with the user and/or other viewers and/or consumers. In this manner, a user may capture moments and/or events of interest within the spherical video segment as the two dimensional video segment and share the two dimensional video segment with other viewers and/or consumers. The two dimensional video segment may include moments and/or events of interest which the user preferred in order to view the spherical video segment in the future in an easier and more efficient manner, such that the user and/or other viewers may not be required to search through the entirety of the spherical video segment (e.g., the three dimensional video segment) to view such moments and/or events of interest at a particular point in time.

As discussed above, the display may include use by the user as the viewfinder for visual content included within the spherical video segment. The display and/or the viewfinder may include one or more user controls configured to be actuated by the user to control capture of the display field of view as the two dimensional video segment. The one or more user controls may include one or more of a record control, a stop control, a play control, a pause control, controls to fast forward and/or rewind through the spherical video segment and/or the two dimensional video segment, a save control, and/or other user controls that may be used to control capture of the two dimensional video segment (e.g., a control to record the two dimensional video segment in slow motion, etc.). The one or more user controls may be included within the display, within the viewfinder (e.g., associated with display of the spherical video segment), on client computing platform(s) 102, and/or may be included within and/or on other devices and/or applications capable of displaying the spherical video segment and/or recording the two dimensional video segment. The one or more user controls may include one or more buttons associated with client computing platform(s) 102 and/or an application capable of displaying the spherical video segment, levers, switches, and/or any other actuator that may be actuated by the user to control capture of the two dimensional video segment.

Figure 3:
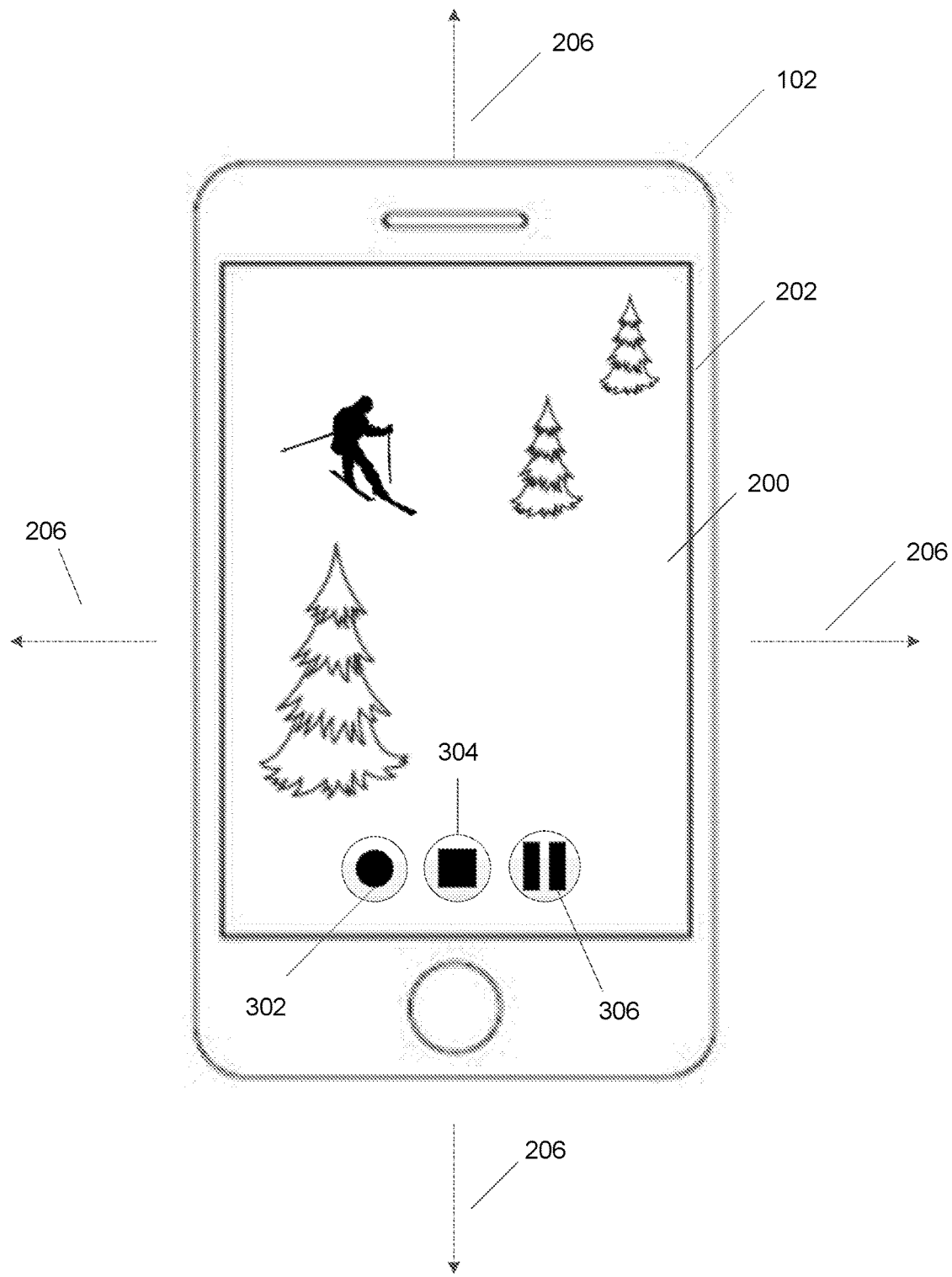
FIG. 3 illustrates an example spherical video segment being presented via a display with user controls, in accordance with one or more implementations.

By way of illustration, FIG. 3 depicts an example spherical video segment 200 being presented on display 202 of client computing platform 102 with user controls 302, 304, 306, in accordance with one or more implementations. While user control 302 depicts a record button, user control 304 depicts a stop button, and user control 306 depicts a pause button, these are for exemplary purposes only and are not meant to be a limitation of this disclosure, as other user controls may be provided. FIG. 3 illustrates an exemplary interface that may allow a user to capture and/or record the display field of view presented via display 202 as a two dimensional video segment. As shown from FIG. 2, arrows 206 may depict directions and/or angles in which display 202 may be oriented such that the user may view other portions of the display field of view presented via display 202. For example, the user may actuate button 302 to begin capturing and/or recording the display field of view presented via display 202 as the two dimensional video segment while the user moves and/or orients client computing platform 102 in various directions and/or angles (e.g., causing the display field of view to follow similar directions as the orientation of display 202). For example, the user may follow the skier depicted in spherical video segment 200 as the skier continues skiing down a slope. The user may move display 202 in the direction the skier is skiing in order to keep the skier in the middle of the display field of view presented via display 202. The user may actuate button 306 to pause the recording and/or actuate button 304 to stop the recording.

Referring back to FIG. 1, in some embodiments, the spherical video segment may include tag information associated with an event of interest within the spherical video segment. The tag information may identify a point in time within the spherical video segment and a viewing angle within the spherical video segment at which the event of interest is viewable in the spherical video segment. The event of interest may include any occurrence within the spherical video segment such as a notable moment and/or interesting point in time within the spherical video segment duration. The event of interest may be a moment that a user wishes to share with other viewers and/or consumers of the spherical video segment (e.g., the user and/or other users may be interested in the moment and/or event of interest). For example, the event of interest may include one or more of a highlight or a climax of the spherical video segment, something occurring within the spherical video segment apart from a focal (e.g., action) point of the spherical video segment, and/or other event of interest within the spherical video segment. For example an event of interest may include presentation of: a snowboarder landing an impressive jump, a noteworthy rally in a beach volleyball game, a memorable moment within a wildlife video capture, a fans' sign at a sporting event, a crowd reaction within a surfing video, a beautiful nature scene away from the subject wildlife, and/or any other events of interest captured within the spherical video segment.

The tag information may include one or more of a tag, a comment including text, an emoji, and/or an image, and/or other information associated with the tag information and/or the event of interest. In some implementations, users may submit tag information associated with the event of interest via a force touch and/or other inputs. The tag information may be inputted on and/or via one or more user interfaces via the display associated with client computing platform(s) 102. For example, a user may tap and/or touch the display associated with client computing platform(s) 102 while viewing the spherical video segment to mark and/or tag the point in time and the viewing angle (e.g., location) of the event of interest within the spherical video segment. The user may simply tap the display to mark and/or tag the event of interest and/or may enter a comment associated with the mark and/or tag using a keypad and/or other input device associated with client computing platform(s) 102. System 100 may receive the tag information from client computing platform(s) 102.

The tag information may identify the point in time in the spherical video segment at which the event of interest is viewable in the spherical video segment. System 100 may receive the point in time from the user such that the user may select and/or choose where in the spherical video segment the event of interest occurs, begins, and/or is about to begin. For example, the user may select the point in time within the spherical video segment such that a timestamp may be associated with the event of interest. The point in time may include a single point in time, a range of time, multiple points in time, and/or other point in time indications.

The tag information may identify a viewing angle within the spherical video segment at which the event of interest is viewable in the spherical video segment. The viewing angle may reference a location within the spherical video segment in which the event of interest is viewable. System 100 may receive the viewing angle from the user such that the user may select and/or choose where in the spherical video segment the event of interest occurs, begins, and/or is about to begin. For example, the user may select the viewing angle within the spherical video segment such that a location within the spherical video segment may be associated with the event of interest. The viewing angle may include a number of degrees in a horizontal field of view and/or a number of degrees in a vertical field of view. The viewing angle may include one or more of a range of viewing angles, an individual view point based upon the viewing angle, a view point and its vicinity, and/or other viewing angles associated with the event of interest. The viewing angle may be relative to the display field of view.

The viewing angle may include one or more dimensions identifying where within the spherical video segment the event of interest is located, and/or what field(s) of view will be able to observe the portion of the spherical video segment at which the event of interest is viewable. For example, the viewing angle may include one or more of a horizontal field of view (e.g., left to right), a vertical field of view (e.g., height, up, and/or down), and/or other location information. The viewing angle and/or information associated with the viewing angle may be defined by one or more of a Cartesian coordinate system, a cylindrical and/or polar coordinate system, a spherical and/or polar coordinate system, other coordinate system, and/or other data.

The tag information including the point in time and the viewing angle at which the event of interest is viewable may be stored within electronic storage 122 and/or may be stored within an electronic storage associated with server(s) 104. Spherical segment component 106 may be configured to obtain the tag information associated with the event of interest. If stored on one or more server(s) 104, the tag information may be transmitted over the network to one or more client computing platform(s) 102 such that it may be received by spherical segment component 106.

Upon presentation component 114 presenting the display field of view of the spherical video segment on the display, as discussed above, field of view component 112 may be configured to, proximate to the point in time, determine whether the viewing angle of the event of interest is located within the display field of view. Proximate to the point in time at which the event of interest is viewable may include one or more of a predefined time period prior to the point in time at which the event of interest is viewable, a predefined time period after the point in time at which the event if viewable, and/or the point in time at which the event of interest is viewable. As discussed above, the display field of view may be determined on a recurring or ongoing basis. The display field of view may indicate a current field of view determined based upon the orientation of the display associated with client computing platform(s) 102 during presentation of the spherical video segment. The display field of view may change one or more times over the course of presentation of the spherical video segment via the display. The display field of view may include the viewing angle visible to the user via the display at a current point in time, as numerous fields of view that are not visible to the user may be available at the current point in time (e.g., 180-degrees to the left or right of the display field of view may not be visible to the user via the display field of view unless the display is moved to the left or right). Field of view component 114 may automatically alter the display field of view for the user automatically to display the event of interest and/or the user may alter the display field of view based upon the movements of the client computing platform(s).

The display field of view may include one or more visible ranges of viewing angles within the spherical video segment for a window in time within the spherical video segment. The window of time within the spherical video segment may include and/or correspond to the proximate point in time associated with the point in time. The window of time may correspond to the point in time and/or range of time relevant to the event of interest. The window of time within the spherical video segment may include a separate or partially separate window of time, a period of time associated with the tag information, the segment duration, and/or another point in time, portion of time, and/or range of time within the spherical video segment. For example, the window of time may include a portion of the duration of the spherical video segment that begins prior to the period of time begins such that the viewing angle may indicate the display field of view for the user prior to the beginning of the period of time for the event of interest indicated by the tag information. The window of time may be determined by field of view component 112, and/or selected and/or otherwise indicated by a user.

Field of view component 112 may be configured to determine whether the field of view associated with the tag information is located within and/or outside the display field of view proximate to the point in time. In some implementations, within the display field of view may include completely and/or partially within the display field of view. Outside the display field of view may include completely and/or partially outside, and/or off-centered within the display field of view. In some implementations, the determination of whether the viewing angle associated with the tag information is located within and/or outside the display field of view may be determined in an ongoing and/or reoccurring manner for the duration of the spherical video segment.

Notification component 118 may be configured to, responsive to a determination proximate to the point in time that the viewing angle is outside the display field of view, generate alert information indicating the event of interest for the spherical video segment is located outside the display field of view. The alert information may indicate the location of the event of interest within the spherical video segment indicated by the tag information. The alert information may include the viewing angle associated with the tag information, the point in time associated with the tag information, and/or other information related to the event of interest indicated by and/or associated with the tag information. If notification component 118 is on one or more server(s) 104, notification component 118 may be configured to effectuate transmission of the alert information over the network to one or more client computing platform(s) 102 associated with the display on which the spherical video segment may be presented.

Notification component 118 may be configured to effectuate presentation of a notification based upon the alert information. The notification may include one or more of a graphical notification, an audible notification, a sensory notification, and/or other types of notifications. For example, the notification may include an alert message presented within the display field of view of the spherical video segment. The notification, for example, may include an alert sound audible to the user. An example sensory notification may include a vibration and/or light notification. The notification may indicate to the user that the user may be missing, has missed, and/or may be about to miss the event of interest of the spherical video segment that may be occurring outside the display field of view.

A visible notification may be presented at and/or near the center of the display field of view, in the periphery of the display field of view, and/or at other locations within the display field of view of spherical video segment. An audible notification may include a notification sound played by a speaker, within one or more earphones, within one or both sides of headphones, and/or other audible notifications. A sensory notification may be delivered via client computing platform(s) 102, one or more display devices associated with client computing platform(s) 102, one or more control (e.g., user interfacing) devices associated with client computing platform(s) 102, and/or other devices.

The notification may include a direction to orient the display to include the viewing angle within the display field of view. The notification may indicate where within the spherical video segment the event of interest is taking and/or is about to take place. The notification may include a direction to orient the display to include the viewing angle associated with the tag information within the display field of view. The notification may include a number of degrees to angle and/or move the display such that the event of interest may be displayed within the display field of view. For example, proximate to the point in time associated with the tag information, a graphical notification may include "Look to your left to see something cool!" The graphical notification may include an arrow pointing in the direction to move the display such that the event of interest may be displayed within the display field of view. An audible notification, for example, may include a spoken message of "Don't miss what is happening to your right" and/or a sound may be played in the right ear of the user to indicate to the user that the user should look to the right. The sound may be played in the left ear of the user to indicate to the user that the user should look to the left.

The notification may include the point in time at which the event of interest is viewable. The notification may indicate the point in time within the spherical video segment the event of interest is taking place, is about to take place, and/or did take place. For example, the graphical notification may include "Look to your left to see something cool at 2 minutes and 8 seconds!" The graphical notification may include a timer that counts down until the point in time. The audible notification, for example, may include a spoken message of "Don't miss what is happening to your right in 10 seconds." Notification component 118 may be configured to effectuate presentation of the notification after the point in time has passed. System 100 may provide user controls, as discussed above, to allow the user associated with client computing platform(s) 102 to fast forward, rewind, view in slow motion, and/or other user controls to control display and/or manipulation of the spherical video segment.

Figure 4:
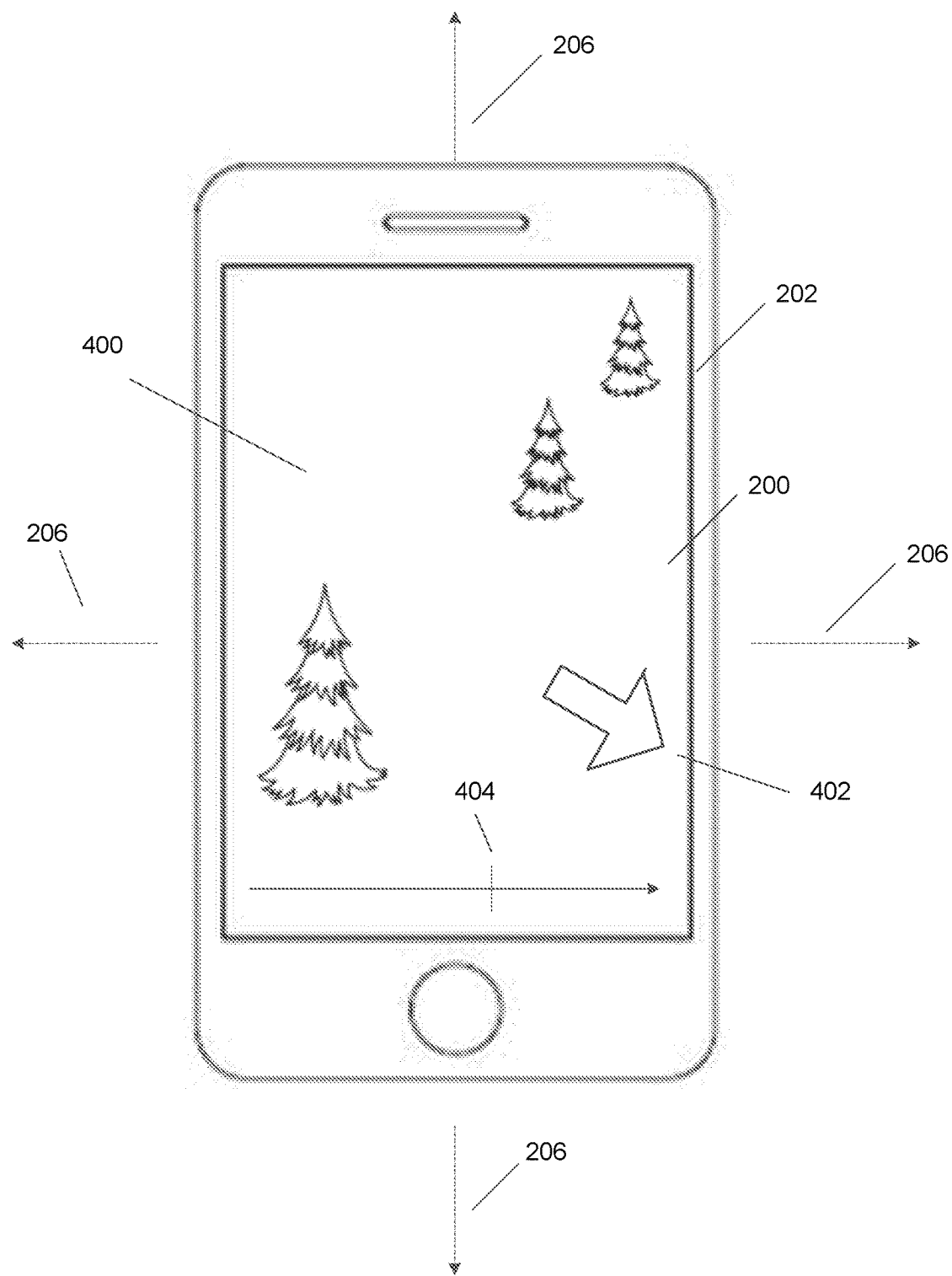
FIG. 4 illustrates an example display field of view of a spherical video segment including a notification, in accordance with one or more implementations.

By way of illustration, FIG. 4 depicts an example display field of view 400 of spherical video segment 200 including notification 402 at point in time 404, in accordance with one or more implementations. Responsive to a determination proximate point in time 404 (e.g., point in time 404 being 60 seconds into spherical video segment 200) that a viewing angle associated with tag information associated with an event of interest is located outside display field of view 400, notification 402 may be generated and presented within field of view 400. Notification 402 may indicate that an event of interest within spherical video segment 200 is about to take place and/or is taking place outside field of view 400. Notification 402 may indicate a direction toward which the user should orient display 202 to observe the portion of spherical video segment 400 that may include the event of interest. For example, perhaps the skier from FIGS. 2 and 3 performs a jump at 67 seconds into spherical video segment 200. As the skier is no longer depicted within field of view 400, notification 402 may indicate which direction to orient display 202 to view the skier and/or the event of interest (e.g., the skip jump) within display field of view 400 again. While notification 402 is depicted in FIG. 4 as an arrow, this is for exemplary purposes only and is not meant to be a limitation of this disclosure, as other notifications may be provided.

As discussed above, system 100 may receive, via client computing platform(s) 102 associated with the display, the tag information associated with the event of interest such that the user may be reminded of the event of interest next time the user views the spherical video segment and/or so other viewers and/or consumers may not miss the event of interest while viewing the spherical video segment. While the consumer other than the user views the spherical video segment, the consumer may wish to mark and/or tag, in a similar manner as discussed above, a second event of interest within the spherical video segment for his or her reference and/or for other viewers and/or consumers. The tag information associated with the second event of interest may identify a second point in time in the spherical video segment and a second viewing angle within the spherical video segment at which the second event of interest may be viewable within the spherical video segment. The tag information associated with the second event of interest may be stored within electronic storage 122 and/or other storage device. In a similar manner as discussed above, system 100 may effectuate transmission of the tag information associated with the second event of interest to a second client computing platform associated with a second consumer, such that the second consumer may view the spherical video segment via a display associated with the second client computing platform. Notifications may be presented for the event of interest and/or the second event of interest as the second consumer views the spherical video segment. The spherical video segment may include any number of events of interest via the tag information, which may be received by the same user and/or other users. Any number of notifications for individual events of interest may be presented for future viewers of the spherical video segment.

In some implementations, the tag information may be used for editing the spherical video segment. For example, editing the spherical video segment may include one or more of: selecting and/or compiling a two dimensional video segment of the spherical video segment; augmenting (e.g., removing content, etc.), enhancing (e.g., color correcting, etc.), and/or otherwise refining one or more portions and/or sections (e.g., frames, and/or other portions and/or sections) of the spherical video segment; and/or otherwise editing one or more portions and/or sections (e.g., frames, and/or other portions and/or sections) of the spherical video segment. The tag information for the spherical video segment may indicate one or more portions and/or sections (e.g., frames, and/or other portions and/or sections) of the spherical video segment that should be edited. The tag information may be used to select portions and/or sections from the spherical video segment to edit.

Returning to FIG. 1, client computing platforms 102, server(s) 104, and/or external resources 120 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which client computing platform(s) 102, server(s) 104, and/or external resources 120 may be operatively linked via some other communication media.

The external resources 120 may include sources of information, hosts and/or providers of virtual spaces outside of system 100, external entities participating with system 100, external entities for digital content and/or digital content platforms, and/or other resources. In some implementations, some or all of the functionality attributed herein to external resources 120 may be provided by resources included in system 100.

The client computing platform(s) 102 may include electronic storage 122, one or more processor(s) 124, and/or other components. The client computing platform(s) 102 may include communication lines or ports to enable the exchange of information with a network and/or other servers and/or computing platforms. Illustration of client computing platform(s) 102 in FIG. 1 is not intended to be limiting. The client computing platform(s) 102 may include a plurality of hardware, software, and/or firmware components operating together to provide the functionality attributed herein to client computing platform(s) 102. For example, client computing platform(s) 102 may be implemented by a cloud of computing platforms operating together as client computing platform(s) 102.

One or more server(s) 104 may include an electronic storage, one or more processors, computer readable instructions configured to execute components 106-118.

Electronic storage 122 may comprise electronic storage media that electronically stores information. The electronic storage media of electronic storage 122 may include one or both of system storage that is provided integrally (i.e., substantially non-removable) with client computing platform(s) 102 and/or removable storage that is removably connectable to client computing platform(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from client computing platform(s) 102, information received from server(s) 104, and/or other information that enables client computing platform(s) 102 to function as described herein.

Processor(s) 124 are configured to provide information processing capabilities in client computing platform(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 124 may be configured to execute components 106-118. Processor 124 may be configured to execute components 106, 108, 110, 111, 112, 114, 116, and/or 118 by software; hardware; firmware; some combination of software, hardware, and/or firmware; and/or other mechanisms for configuring processing capabilities on processor(s) 124.

It should be appreciated that although components 106-118 are illustrated in FIG. 1 as being located and/or co-located within a particular component of system 100, in implementations in which physical processor(s) 124 include multiple processing units, one or more of components 106-118 may be located remotely from the other components. The description of the functionality provided by the different components 106-118 described herein is for illustrative purposes, and is not intended to be limiting, as any of components 106-118 may provide more or less functionality than is described. For example, one or more of components 106-118 may be eliminated, and some or all of its functionality may be incorporated, shared, integrated into, and/or otherwise provided by other ones of components 106-118. Note that physical processor(s) 124 may be configured to execute one or more additional components that may perform some or all of the functionality attributed herein to one of components 106-118.

One or more of the components of system 100 may be configured to present and/or provide a user interface to provide an interface between system 100 and a user (e.g. a controlling entity, and/or other users using a graphical user interface) through which the user can provide information to and receive information from system 100. This enables data, results, and/or instructions (e.g., determinations, selections, and/or other indications) and any other communicable items, collectively referred to as "information," to be communicated between the user and system 100. An example of information that may be conveyed by a user and/or controlling entity is a selected time indication, a selected location indication, a user comment and/or comment information, and/or other information. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 5:
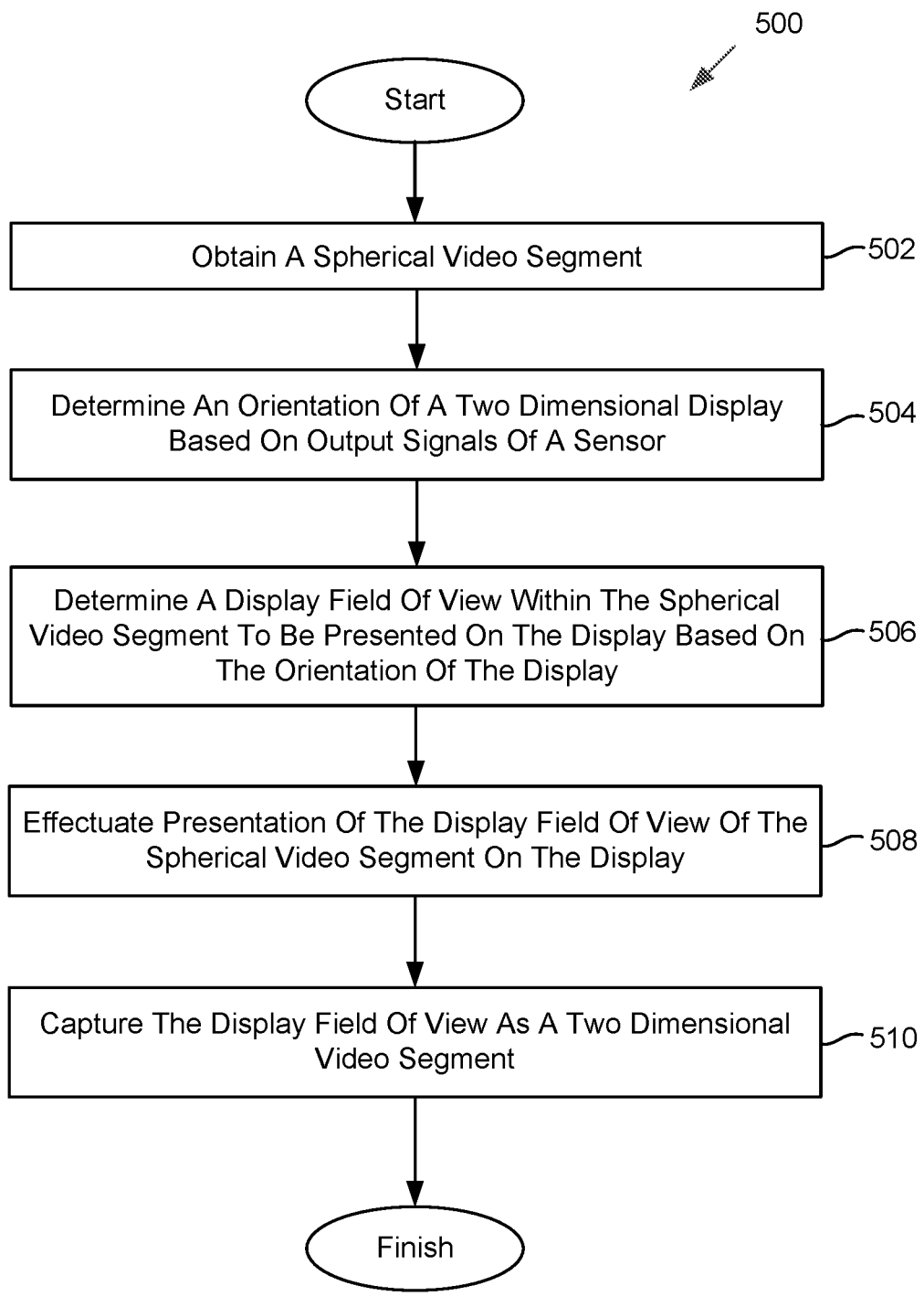
FIG. 5. illustrates a method configured for viewing a spherical video segment, in accordance with one or more implementations.
Figure 6:
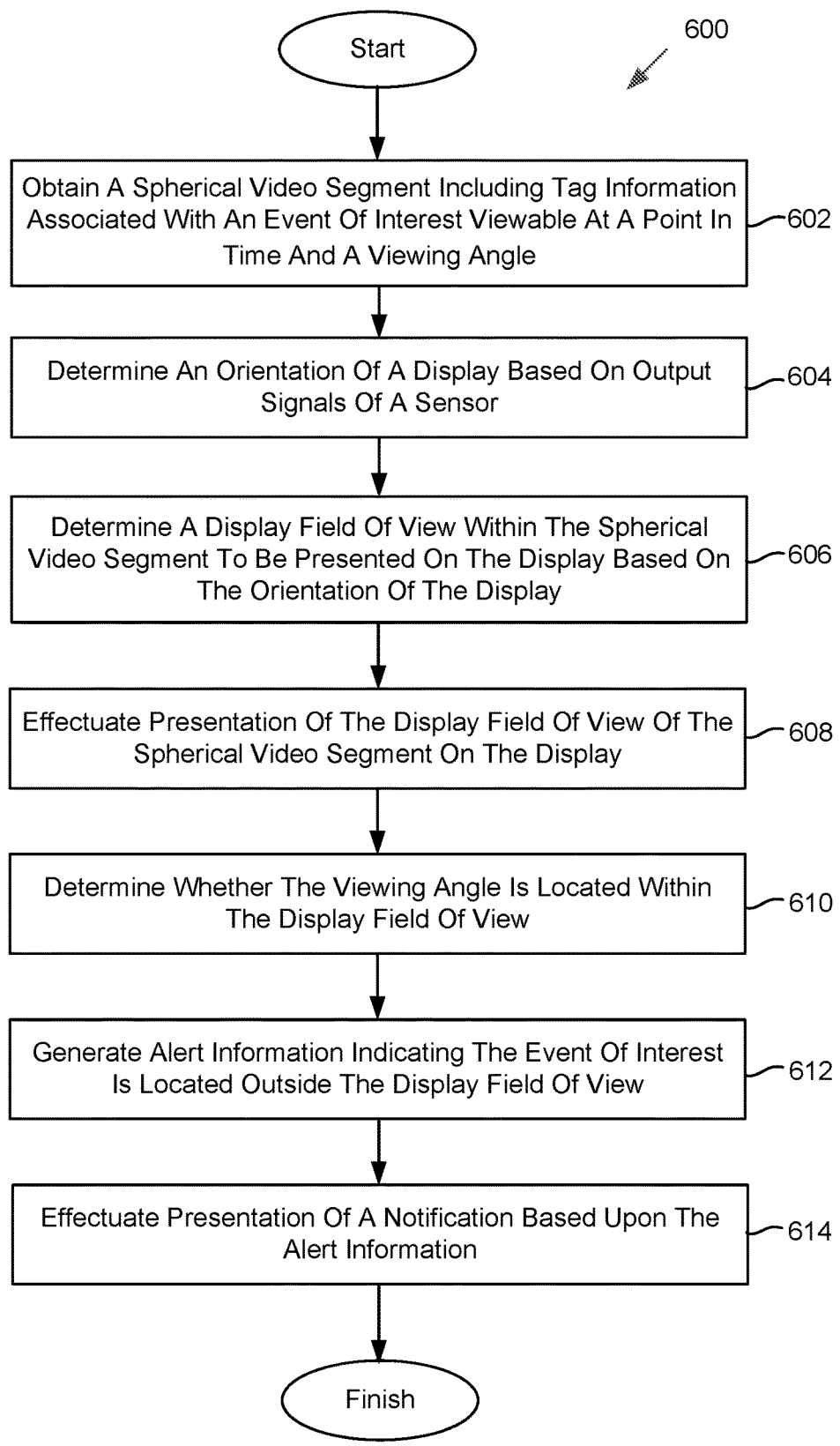
FIG. 6. illustrates a method configured for presenting an event of interest within a spherical video segment, in accordance with one or more implementations

FIGS. 5 and 6 illustrate exemplary methods 500 and 600 for presenting and viewing a spherical video segment, in accordance with one or more implementations. The operations of methods 500 and/or 600 presented below are intended to be illustrative and non-limiting examples. In certain implementations, methods 500 and/or 600 may be accomplished with one or more additional operations not described, and/or without one or more of the operations discussed. Additionally, the order in which the operations of methods 500 and/or 600 are illustrated in FIGS. 5 and/or 6 and described below is not intended to be limiting.

In certain implementations, methods 500 and/or 600 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of methods 500 and/or 600 in response to instructions stored electronically on an electronic storage medium. The one or more processing devices may include one or more devices configured through hardware, firmware, and/or software to be specifically designed for execution of one or more of the operations of method 500.

Regarding method 500, at an operation 502, a spherical video segment may be obtained. In some implementations, operation 502 may be performed by a spherical segment component that is the same as or similar to spherical segment component 106 (shown in FIG. 1 and described herein).

At an operation 504, an orientation of a two dimensional display may be determined based upon output signals of a sensor. The two dimensional display may be configured to present two dimensional images. The sensor may be configured to generate output signals conveying information related to the orientation of the display. In some implementations, operation 504 may be performed by an orientation component that is the same as or similar to orientation component 108 (shown in FIG. 1 and described herein).

At an operation 506, a display field of view within the spherical video segment to be presented on the display may be determined based upon the orientation of the display. In some implementations, operation 506 may be performed by a field of view component that is the same as or similar to field of view component 112 (shown in FIG. 1 and described herein).

At an operation 508, the display field of view of the spherical video segment may be presented on the display. In some implementations, operation 508 may be performed by a presentation component that is the same as or similar to presentation component 114 (shown in FIG. 1 and described herein).

At an operation 510, the display field of view may be captured as a two dimensional video segment. In some implementations, operation 510 may be performed by a capture component that is the same as or similar to capture component 116 (shown in FIG. 1 and described herein).

Regarding method 600, at an operation 602, a spherical video segment may be obtained. The spherical video segment may include tag information associated with an event of interest in the spherical video segment. The tag information may identify a point in time in the spherical video segment and a viewing angle in the spherical video segment at which the event of interest is viewable in the spherical video segment. In some implementations, operation 502 may be performed by a spherical segment component that is the same as or similar to spherical segment component 106 (shown in FIG. 1 and described herein).

At an operation 604, an orientation of a two dimensional display may be determined based upon output signals of a sensor. The two dimensional display may be configured to present two dimensional images. The sensor may be configured to generate output signals conveying information related to the orientation of the display. In some implementations, operation 604 may be performed by an orientation component that is the same as or similar to orientation component 108 (shown in FIG. 1 and described herein).

At an operation 606, a display field of view within the spherical video segment to be presented on the display may be determined based upon the orientation of the display. In some implementations, operation 606 may be performed by a field of view component that is the same as or similar to field of view component 112 (shown in FIG. 1 and described herein).

At an operation 608, the display field of view of the spherical video segment may be presented on the display. In some implementations, operation 608 may be performed by a presentation component that is the same as or similar to presentation component 114 (shown in FIG. 1 and described herein).

At an operation 610, whether the viewing angle is located within the display field of view proximate to the point in time may be determined. In some implementations, operation 610 may be performed by a field of view component that is the same as or similar to field of view component 112 (shown in FIG. 1 and described herein).

At an operation 612, responsive to a determination proximate to the point in time that the viewing angle is outside the display field of view, alert information may be generated. The alert information may indicate the event of interest for the spherical video segment is located outside the display field of view. In some implementations, operation 612 may be performed by a notification component that is the same as or similar to notification component 118 (shown in FIG. 1 and described herein).

At an operation 614, a notification may be presented based upon the alert information. The notification may include the alert information and may be presented within the display field of view. In some implementations, operation 614 may be performed by a notification component that is the same as or similar to notification component 118 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for facilitating use of a display as a viewfinder into a spherical video segment and capturing a video segment from the spherical video segment, the system comprising:
    the display configured to present two-dimensional images;
    a sensor configured to generate output signals conveying information related to an orientation of the display, wherein the orientation of the display is a three-dimensional orientation of the display in the real world, and wherein the output signals adjust over time in correspondence with adjustments of the three-dimensional orientation of the display over time;
    one or more physical computer processors configured by computer readable instructions to:
        obtain the spherical video segment, wherein the spherical video segment is a segment of video content that has been captured by one or more image sensors configured to capture both a 360-degree horizontal field-of-view and at least a 180-degree vertical field-of-view;
        determine the three-dimensional orientation of the display in the real world based on the output signals such that the three-dimensional orientation can be used to determine a display field-of-view within the spherical video segment, wherein the output signals are generated by the sensor, and wherein the three-dimensional orientation of the display adjusts over time during presentation of the video content;
        determine the display field-of-view within the spherical video segment to be presented on the display such that the display field-of-view presented on the display can be used as a viewfinder into the spherical video segment, wherein the display field-of-view is based on the three-dimensional orientation of the display, and wherein adjustments of the three-dimensional orientation of the display over time during presentation of the video content correspond to adjustments of the display field-of-view;
        effectuate presentation of the display field-of-view of the spherical video segment on the display to facilitate use of the display as a viewfinder into the spherical video segment; and
        capture the presented display field-of-view of the spherical video segment as a two-dimensional video segment.

2. The system of claim 1, wherein capturing the presented display field-of-view of the spherical video segment includes capturing a single field-of-view over a span of time.

3. The system of claim 1, wherein capturing the presented display field-of-view of the spherical video segment includes recording the three-dimensional orientation of the display over time.

4. The method of claim 1, wherein capturing the presented display field-of-view as the two-dimensional video segment includes creating a separate video segment other than the spherical video segment.

5. The system of claim 1, wherein the one or more processors are further configured to:
    store the two-dimensional video segment.

6. The system of claim 1, wherein the one or more processors are further configured to:
    effectuate presentation of the two-dimensional video segment on the display.

7. The system of claim 1, wherein the display includes use by a user as a viewfinder for visual content included within the spherical video segment and includes one or more user controls configured to be actuated by the user to control capture of the display field-of-view as the two-dimensional video segment.

8. The system of claim 1, wherein the display is associated with a first client computing platform.

9. The system of claim 8, wherein the one or more processors are further configured to:
    effectuate transmission of the two-dimensional video segment to a second client computing platform.

10. The system of claim 9, wherein the one or more processors are further configured to:
    effectuate presentation of the two-dimensional video segment on a display associated with the second client computing platform.

11. A method for facilitating use of a display as a viewfinder into a spherical video segment and for capturing a video segment from the spherical video segment, the method comprising:
    obtaining the spherical video segment, wherein the spherical video segment is a segment of video content that has been captured by one or more image sensors that capture both a 360-degree horizontal field-of-view and at least a 180-degree vertical field-of-view;
    determining an orientation of the display based on output signals generated by a sensor such that the orientation can be used to determine a display field-of-view within the spherical video segment, wherein the orientation of the display is a three-dimensional orientation of the display in the real world, wherein the display presents two-dimensional images, wherein the generated output signals convey information related to the orientation of the display, and wherein the output signals adjust over time in correspondence with adjustments of the three-dimensional orientation of the display over time;
    determining the display field-of-view within the spherical video segment to be presented on the display such that the display field-of-view presented on the display can be used as a viewfinder into the spherical video segment, wherein the display field-of-view is based on the three-dimensional orientation of the display, and wherein adjustments of the three-dimensional orientation of the display over time during presentation of the video content correspond to adjustments of the display field-of-view;

effectuate presentation of the display field-of-view of the spherical video segment on the display to facilitate use of the display as a viewfinder into the spherical video segment; and capturing the presented display field-of-view of the spherical video segment as a two-dimensional video segment.

12. The method of claim 11, wherein capturing the presented display field-of-view of the spherical video segment includes capturing a single field-of-view over a span of time.

13. The method of claim 11, wherein capturing the presented display field-of-view of the spherical video segment includes recording the three-dimensional orientation of the display over time.

14. The method of claim 11, wherein capturing the presented display field-of-view as the two-dimensional video segment includes creating a separate video segment other than the spherical video segment.

15. The method of claim 11, further comprising:
storing the two-dimensional video segment.

16. The method of claim 11, further comprising:
effectuating presentation of the two-dimensional video segment on the display.

17. The method of claim 11, wherein the display includes use by a user as a viewfinder for visual content included within the spherical video segment and includes one or more user controls that are actuated by the user to control capture of the display field-of-view as the two-dimensional video segment.

18. The method of claim 11, wherein the display is associated with a first client computing platform.

19. The method of claim 18, further comprising:
effectuating transmission of the two-dimensional video segment to a second client computing platform.

20. The method of claim 19, further comprising:
effectuating presentation of the two-dimensional video segment on a display associated with the second client computing platform.

21. The system of claim 1, wherein the orientation of the display is determined relative to a ground level in the real world.

* * * * *